Sept. 24, 1929.  P. J. BOWMAN  1,729,203
HARD GREASE LUBRICATOR
Filed Dec. 10, 1927
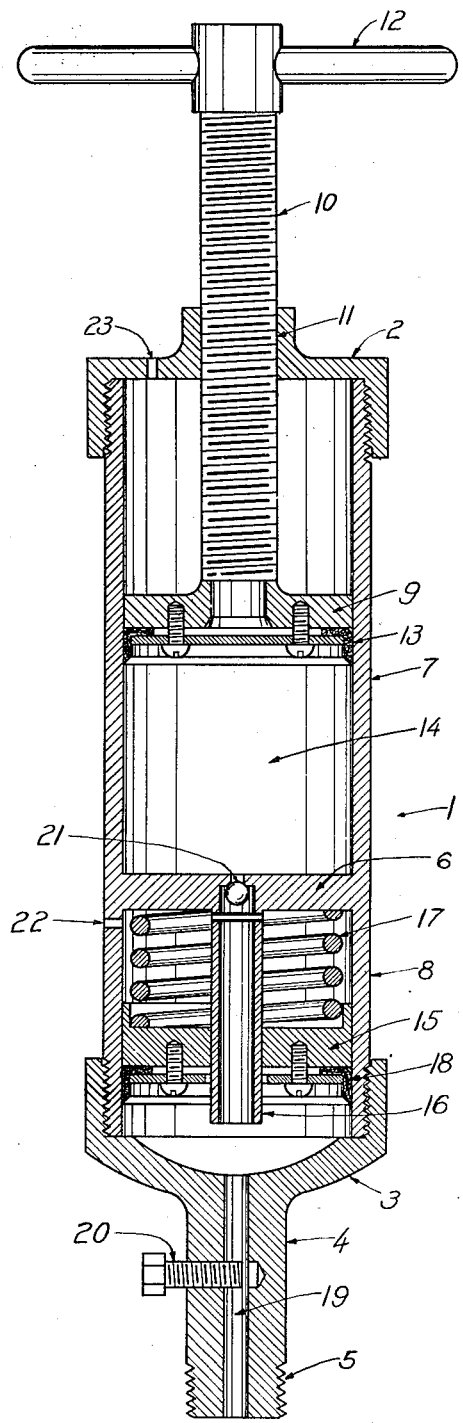
PEARL JAKE BOWMAN
INVENTOR
BY
ATTORNEY Patented Sept. 24, 1929

1,729,203

UNITED STATES PATENT OFFICE

PEARL JAKE BOWMAN, OF BELL, CALIFORNIA

HARD-GREASE LUBRICATOR

Application filed December 10, 1927. Serial No. 239,131.

My invention relates to the art of journal lubrication, with especial reference to a device for steadily feeding grease into a continuously running bearing.

The objects of my invention are:

1. To provide a lubricator capable of feeding grease to a bearing whenever additional grease is required.

2. To provide in a grease lubricator means for controlling the rate of grease flow.

3. To provide a lubricator which is economical in the use of grease.

4. To provide a lubricator simple in operation and easily attended to by the operator.

I attain these objects by the mechanism illustrated in the accompanying drawing, in which Figure 1 is a vertical cross sectional elevation of a preferred embodiment of my present invention.

Referring to Fig. 1 the body of my lubricator is composed of a cylinder 1 closed at its upper end by the cap 2, its bottom end being closed by the cap 3 which is provided with a tubular extension 4 threaded at 5 for attaching the lubricator to the journal cap or other device to be lubricated. A lateral partition 6 divides cylinder 1 into the reservoir cylinder 7 at its upper part and a feeding cylinder 8 in the lower part. The volume relation of these two cylinders must be determined from the working conditions. In general the reservoir cylinder will have about five times the volume of the feeding cylinder. In cylinder 7 a piston 9 functions being carried on one end of a threaded rod 10 which is adapted to screw through the threaded bore 11 in cap 2. Rod 10 is provided with a handle 12 on its upper end. Obviously by rotating rod 10 the piston 9 is moved in the cylinder. Piston 9 is provided with a cup leather 13 adapted to contact with the cylinder and prevent leakage of lubricant past the piston from the space 14.

In the feeding cylinder 8 a piston 15 functions. A central tube 16 secured to and communicating through partition 6 with space 14 extends downward in cylinder 8 through piston 15 beyond the lowermost position of this piston, which is provided with a bore adapted to slide without leakage along the exterior of tube 16. A spring 17 is interposed between piston 15 and partition 6, tending to force this piston down toward the end closed by cap 3. Piston 15 is equipped with a cup leather 18 in contact with the wall of cylinder 8 for preventing upward leakage between the piston and the wall.

In operation, my lubricator is secured to the bearing by threads 5, the bearing being provided with suitable passages to carry the grease to the surfaces to be lubricated. The operator unscrews cap 2 and removes piston 9 from cylinder 7 which he then fills with a suitable grease, after which the piston and cap are replaced, but first screwing cap 2 along rod 10 until it touches the piston. Then by turning rod 10 the piston is moved down forcing the grease through tube 16 into cylinder 8 under piston 15 and out into the bearing through bore 19 in the tubular extension 4. The pressure required to cause the grease to flow rapidly through the small clearance spaces in the bearing increases as they fill with grease, until it becomes great enough to cause piston 15 to move upward, compressing spring 17. As the grease works out of the bearing, consequently reducing the pressure on the grease, piston 15 moved by spring 17 continually forces more grease into the bearing. This balance of forces is economical in the use of grease as it only feeds as the grease escapes from the bearing due to the movement of the lubricated parts. The operator on his regular inspection rounds gives handle 12 a turn or two forcing more grease into the feeding cylinder. As the lubricator needs to be filled only once a day or even less often the possibility of wasting grease is much less, and the probability of keeping the bearing properly supplied with grease is much enhanced.

A further means of regulating the rate of grease flow or of stopping it completely is provided in the tubular extension 4. It consists simply of a pin 20 adapted to screw laterally through one wall of tube 4 and plug the passage 19.

A check valve 21 is provided in tube 14 for preventing the return of grease to cylinder 7 so that even during filling, the lubricator continues to feed grease to the bearing. A drilled hole 22 in the wall of cylinder 8 above the travel of piston 15 vents this cylinder to the atmosphere. A drilled hole 23 through cap 2 vents cylinder 7 above piston 9.

I am aware that there are many grease handling lubricators in use and I do not broadly claim such a means. What I do claim is limited solely by the spirit of the following claims.

I claim as my invention:

1. A lubricator comprising: means for continuously feeding grease to a bearing and means for filling said feeding means with said grease without interrupting the feeding of said grease from said feeding means, in which the feeding means comprises; a cylinder and a piston therein; resilient means arranged to react against said piston and against a stop integral with said cylinder; means for closing the end of said cylinder toward which the piston is moved by said resilient means, said closure means bearing a tubular extension communicating with said cylinder and with the grease passages into a journal; and means for introducing the grease from the filling means into said cylinder between said piston and said closure means.

2. A grease lubricator comprising a tubular body divided into a feeding cylinder and a reservoir cylinder by a transverse partition; a piston within said feeding cylinder; a resilient means for actuating said feeding piston; a filling piston within said reservoir cylinder; means for moving said filling piston; means for conveying said grease from said filling cylinder to said feeding cylinder beneath said feeding piston thereby forcing said feeding piston upward, compressing said resilient means and providing storage for said grease; and tubular communicating means between said feeding cylinder and a bearing for feeding grease to said bearing by the action of said resilient means.

3. A grease lubricator comprising: a tubular body; an upper detachable closure for said body; a threaded opening in said closure; a temper screw fitted in said threaded opening; an upper piston within said tube adapted to be forced downwardly by revolution of said temper screw; a fixed transverse partition across said tube below said upper piston; a perforation through said partition and a check valve on the lower side of said perforation; a tubular downward extension of said perforation attached to said partition; a lower piston fitting around said tubular extension and within said tube; a spring arranged within said tube between said lower piston and said partition; a closure at the lower end of said tube, said closure bearing a downward extension arranged to fit an opening into a bearing to be greased and a channel through said downward extension communicating with a space below said lower piston.

4. A grease lubricator, comprising: a reservoir for grease having an extension adapted to fit an opening in a bearing to be greased and a channel through said extension communicating with said reservoir; a piston within said reservoir and a resilient means adapted to force said piston toward said channel; filling means integral with said reservoir for forcing grease into said reservoir beneath said piston to thereby raise said piston and compress said resilient means; a channel between said filling means and said reservoir for the passage of grease toward said reservoir, and a check valve in said channel to prevent the extrusion of grease from said reservoir.

In witness that I claim the foregoing I have hereunto subscribed my name this 3rd day of December, 1927.

PEARL JAKE BOWMAN.